United States Patent [19]
Popov et al.

[11] B 3,925,696
[45] Dec. 9, 1975

[54] STATORLESS DYNAMO-ELECTRIC MACHINE

[75] Inventors: Encho Nikolov Popov; Nikola Ganev Diakov; Emilia Dobreva-Dimitrova; Roumen Konstantinov Apostolov, Hristo Petkov Hristov, all of Sofia, Bulgaria

[73] Assignee: DSO "Elprom", Sofia, Bulgaria

[22] Filed: May 16, 1973

[21] Appl. No.: 360,910

[44] Published under the Trial Voluntary Protest Program on January 28, 1975 as document no. B 360,910.

Related U.S. Application Data
[63] Continuation-in-part of Ser. No. 178,765, Sept. 8, 1971.

[30] Foreign Application Priority Data
Sept. 8, 1970 Bulgaria .................................. 15625

[52] U.S. Cl. ............................ 310/242; 310/247
[51] Int. Cl.² ........................................ H02K 13/00
[58] Field of Search ............ 310/240, 237, 241, 46, 310/67, 115, 229, 219, 233, 235, 236, 239, 242, 245, 127, 224, 225, 226

[56] References Cited
UNITED STATES PATENTS

| | | |
|---|---|---|
| 2,758,231 | 8/1956 | Welter .................... 310/237 |
| 3,079,518 | 2/1968 | Moore .................... 310/115 |
| 3,191,080 | 6/1965 | Edwards ................ 310/115 |
| 3,244,917 | 4/1966 | Gute ...................... 310/237 |
| 3,252,023 | 5/1966 | Schmidt ................. 310/115 |
| 3,275,861 | 9/1966 | Goroszko ................ 310/46 |
| 3,514,654 | 5/1970 | Moresi ................... 310/237 |
| 3,526,797 | 9/1970 | Jueschke ............... 310/245 |
| 3,624,433 | 11/1971 | Jaeschke ................ 310/67 |
| 3,631,273 | 12/1971 | Stein ....................... 310/46 |
| 3,704,759 | 12/1972 | Vitkov ..................... 310/67 |

*Primary Examiner*—R. Skudy
*Attorney, Agent, or Firm*—Karl F. Ross; Herbert Dubno

[57] ABSTRACT

A dynamo-electric machine of the so-called statorless type, with an inductor which in operation counterrotates to the associated rotor armature, has a commutator on a transverse face of that armature engaged by brushes in brush holders which are supported by the inductor for rotation therewith. Each brush is spring-urged in its holder toward the commutator, the holder being mounted with limited axial mobility on a base by means of generally radial elastic legs which on standstill are deflected away from the commutator base by the spring force but in operation are straightened out by the centrifugal force to exert a supplemental contact pressure upon the brush.

3 Claims, 4 Drawing Figures

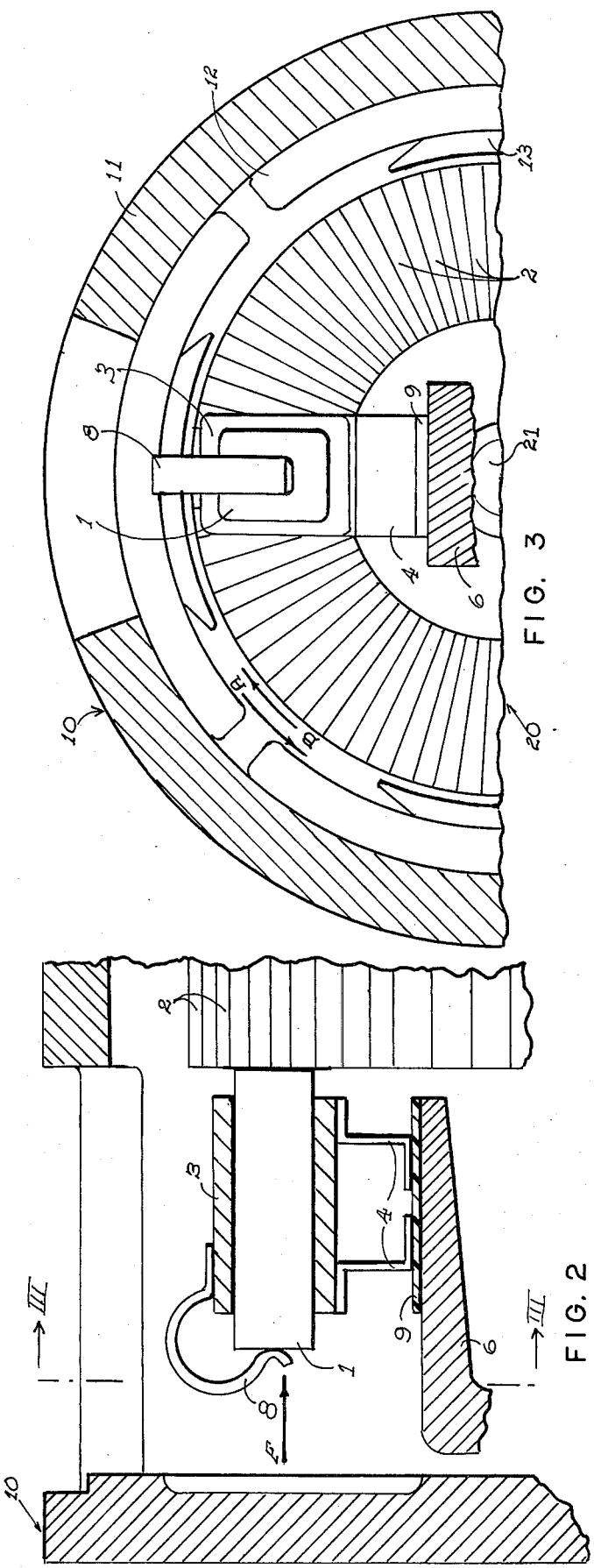

STATORLESS DYNAMO-ELECTRIC MACHINE

CROSS-REFERENCE TO RELATED APPLICATION

This application is a continuation-in-part of our co-pending application Ser. No. 178,765 filed Sept. 8 1971.

FIELD OF THE INVENTION

Our present invention relates to a dynamo-electric machine of the so-called statorless type, i.e., an electric motor or generator whose field windings (or field magnets) are carried on a rotatable inductor coaxial with the rotor. In operation, the inductor and the rotor counterrotate at speeds depending upon their relative moments of inertia.

BACKGROUND OF THE INVENTION

In machines of this type, in which the rotor current passes through an annular commutator on a transverse face of the rotor and through one or more pairs of brushes on the inductor contacting the commutator segments, the centrifugal forces due to the rotation of that inductor tend to deflect the brushes radially outwardly with resulting lowering of the contact pressure. Even with spring-loaded brushes the stress in the brush mounting may lead to discontinuous contact and therefore to arcing.

OBJECTS OF THE INVENTION

The general object of our present invention is to provide an improved mounting for contact brushes carried on a rotating inductor, in a machine of the above-discussed type, which insures proper enegagement of the commutator segments by the brushes to maintain the continuity of the rotor circuit.

A more particular object is to utilize the centrifugal force of such a rotating inductor for intensifying the contact pressure of the brushes with increasing rotary speeds, thereby insuring the maintenance of contact under all operating conditions.

SUMMARY OF THE INVENTION

These objects are realized, pursuant to our present invention, by supporting each brush holder on a common carrier through the intermediary of an elastically deformable mounting, the brush holder being limitedly movable parallel to the rotor axis and being centrifugally biased toward the confronting commutator upon rotation of the inductor.

More specifically, the brush-holder mounting according to our invention forms at least one leg which extends generally radially outwardly from a base on the common brush carrier, the brush being lodged in its holder under spring pressure which tends to shift the holder relatively to the brush in a sense deflecting the mounting leg away from the commutator whereby this leg assumes a nonradial attitude at least on standstill and at low speeds. As the inductor accelerates, the centrifugal force tends to erect the mounting leg or legs of each brush holder which is thus driven closer to the rotor face bearing the commutator, with resulting intensification of the contact pressure.

BRIEF DESCRIPTION OF THE DRAWING

The invention will be described in greater detail with reference to the accompanying drawing in which:

FIG. 2 is an enlarged sectional detail view of a brush holder and associated structure shown in FIG. 1;

FIG. 3 is a cross-sectional view taken on the line III—III of FIG. 2; and

FIG. 4 is a view of the brush holder of FIG. 2 in an alternate position.

SPECIFIC DESCRIPTION

Figure 1:
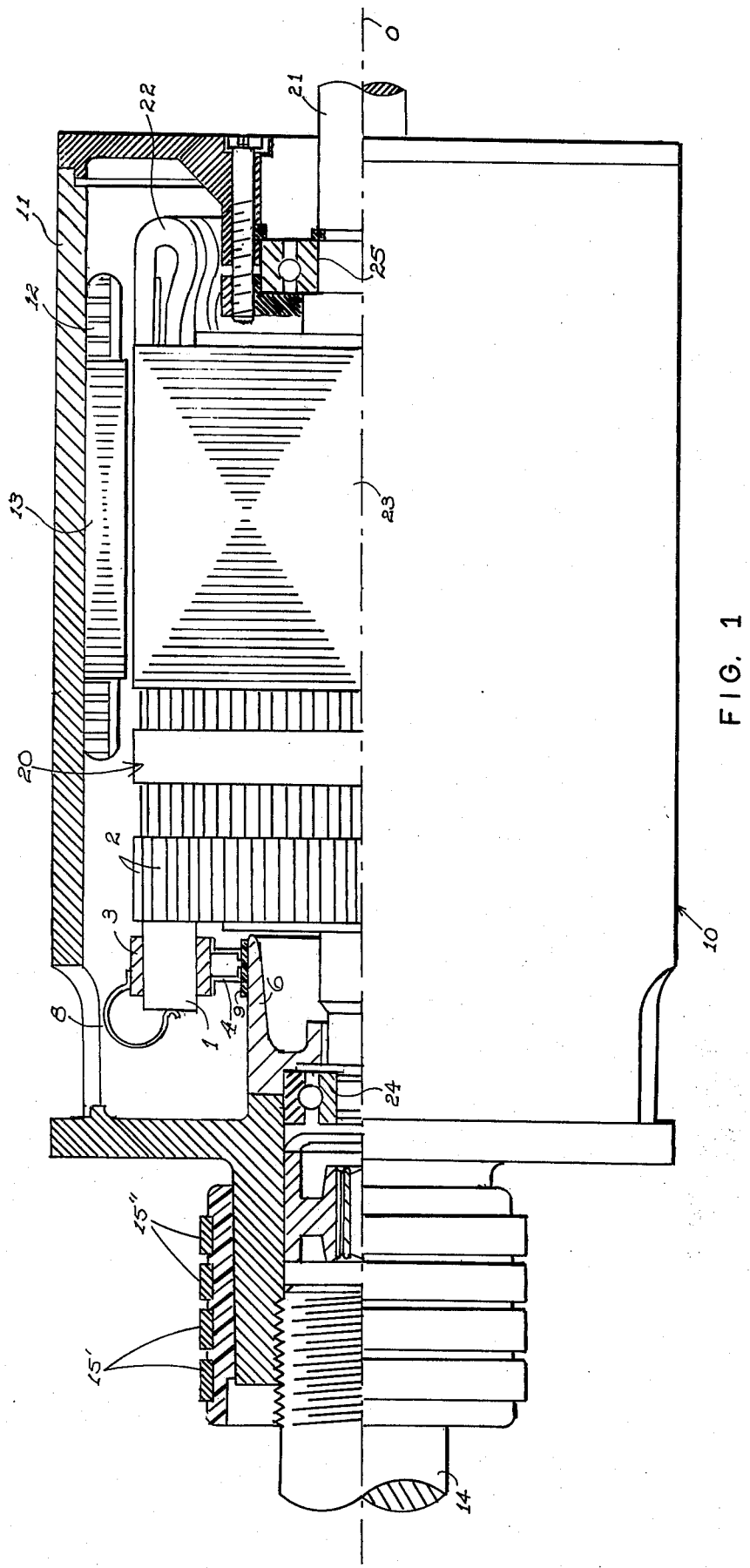
FIG. 1 is a side-elevational view, partly in axial section, of a dynamo-electric machine embodying our invention.

The dynamo-electric machine shown in the drawing comprises two relatively rotatable movable members centered on a common axis O, namely an inductor 10 and a rotor 20.

The inductor comprises a shell 11 carrying field windings 12 with magnetic poles 13, this shell being integral with a shaft 14. Slip rings 15' serve for the energization of the field windings.

Rotor 20 has a shaft 21 supporting an armature with a winding 22 and a laminated core 23 connected to segments 2 of an annular commutator on a front face of the rotor body. Shaft 21 is journaled by bearings 24, 25 in the inductor 10.

Bearing 24 also supports an annular brush carrier 6 which is rigid with the inductor and is electrically linked, through nonillustrated wires, to slip rings 15" for the transmission of current between these slip rings and a pair of diametrically opposite contact brushes 1 (only one shown) slidably disposed in holders 3 which have the shape of prismatic tubes. Each holder 3 is supported on carrier 6 through the intermediary of an insulating base 9 and a pair of generally Z-shaped spring legs 4. A leaf spring 8, fastened to holder 3, bears endwise upon brush 1 to exert axial pressure (arrow F) upon the brush 1, urging it into contact with commutator 2.

As shown in FIG. 4, the pressure of spring 8 tends to withdraw the holder 3 from commutator 2 in the absence of a counteracting centrifugal force whereby the legs 4 are deformed into a nonradial position of their stems. Upon rotation of the inductor 10, however, brush holder 3 is centrifugally urged outwardly so that the legs 4 tend to stretch and assume the substantially radial position illustrated in FIGS. 1 and 2. This swings the brush holder 3 toward the commutator 2, thereby intensifying the contact pressure represented by arrow F.

The relative rotation of inductor 10 and stator 20 has been illustrated by arrows A and B in FIG. 3.

We claim:

1. In a dynamo-electric machine including a rotor armature with a commutator on a face transverse to the axis of rotation, a rotatable inductor centered on said axis, and a set of brush holders with brushes carried by said inductor for contact with said commutator, the improvement wherein said inductor is provided with carrier means for said brushes and elastically deformable mounting on said carrier means supporting each brush holder with limited axial mobility whereby the corresponding brush is centrifugally biased toward said commutator upon rotation of said inductor, said carrier means forming a base for each brush holder disposed radially inwardly thereof, said mounting means forming at least one leg extending generally radially outwardly from said base to the associated brush holder.

2. The improvement defined in claim 1 wherein each brush is provided with spring means for displacing same toward said commutator with reference to the associated brush holder.

3. The improvement defined in claim 1 wherein said leg has a stem biased by said spring means into an off-radial position, diverging from said transverse face, in the absence of a centrifugal force due to rotation of said inductor.

* * * * *